US012243433B2

(12) United States Patent
Ohlarik et al.

(10) Patent No.: US 12,243,433 B2
(45) Date of Patent: Mar. 4, 2025

(54) SYSTEMS AND METHODS FOR INDOOR POSITIONING OF UNMANNED AERIAL VEHICLES

(71) Applicant: Verizon Patent and Licensing Inc., Basking Ridge, NJ (US)

(72) Inventors: Derek Wade Ohlarik, Flemington, NJ (US); Aamir Husain, Jersey City, NJ (US)

(73) Assignee: Verizon Patent and Licensing Inc., Basking Ridge, NJ (US)

(*) Notice: Subject to any disclaimer, the term of this patent is extended or adjusted under 35 U.S.C. 154(b) by 212 days.

(21) Appl. No.: 17/664,939

(22) Filed: May 25, 2022

(65) Prior Publication Data

US 2023/0386350 A1 Nov. 30, 2023

(51) Int. Cl.
*G08G 5/00* (2006.01)
*B64C 39/02* (2023.01)
*H04W 4/38* (2018.01)

(52) U.S. Cl.
CPC ......... *G08G 5/0069* (2013.01); *B64C 39/024* (2013.01); *G08G 5/0034* (2013.01); *H04W 4/38* (2018.02); *B64U 2201/10* (2023.01)

(58) Field of Classification Search
None
See application file for complete search history.

(56) References Cited

U.S. PATENT DOCUMENTS 10,262,466 B2 * 4/2019 Guo .................... G06T 3/00
2018/0259341 A1 * 9/2018 Aboutalib ......... G01C 21/1654

FOREIGN PATENT DOCUMENTS

CN 112362051 A * 2/2021 .......... G01C 21/165
KR 101220234 B1 * 1/2013

OTHER PUBLICATIONS

Filali, Abderrahime, et al. Multi-Access Edge Computing: A Survey, IEEE Access, Received Sep. 18, 2020, accepted Oct. 20, 2020, date of publication Oct. 27, 2020, date of current version Nov. 10, 2020 (https:/ieeexplore.ieee.org/stamp/stamp.jsp?tp=& (Year: 2020).*
Rosnell, T. et al., Point Cloud Generation from Aerial Image Data Acquired by a Quadrocopter Type Micro Unmanned Aerial Vehicle and a Digital Still Camera, Finnish Geodetic.*
Google machine translation of Chinese Patent Pub. CN112362051B.*
Google Machine translation of Chinese Patent Pub. CN113763252A.*
Google patent Machine Translation of EP3392615A1 (Year: 2017).*

* cited by examiner

*Primary Examiner* — Jean Paul Cass

(57) ABSTRACT

In some implementations, a device may receive spatial data corresponding to an interior of a building and objects located in the interior of the building. The device may generate a digital map of the interior of the building based on the spatial data. The device may generate a geographic coordinate map of the interior of the building. The device may receive, from a sensor mounted on an uncrewed aerial vehicle (UAV), sensor data indicating three-dimensional geographic points. The device may compare the sensor data to the geographic coordinate map to localize the UAV on the geographic coordinate map. The device may generate coordinate data indicating geographic coordinates associated with the geographic coordinate map and formatted in a global positioning system coordinate format and a National Marine Electronics Association format. The device may transmit, to a controller of the UAV, at least a subset of the coordinate data.

20 Claims, 10 Drawing Sheets

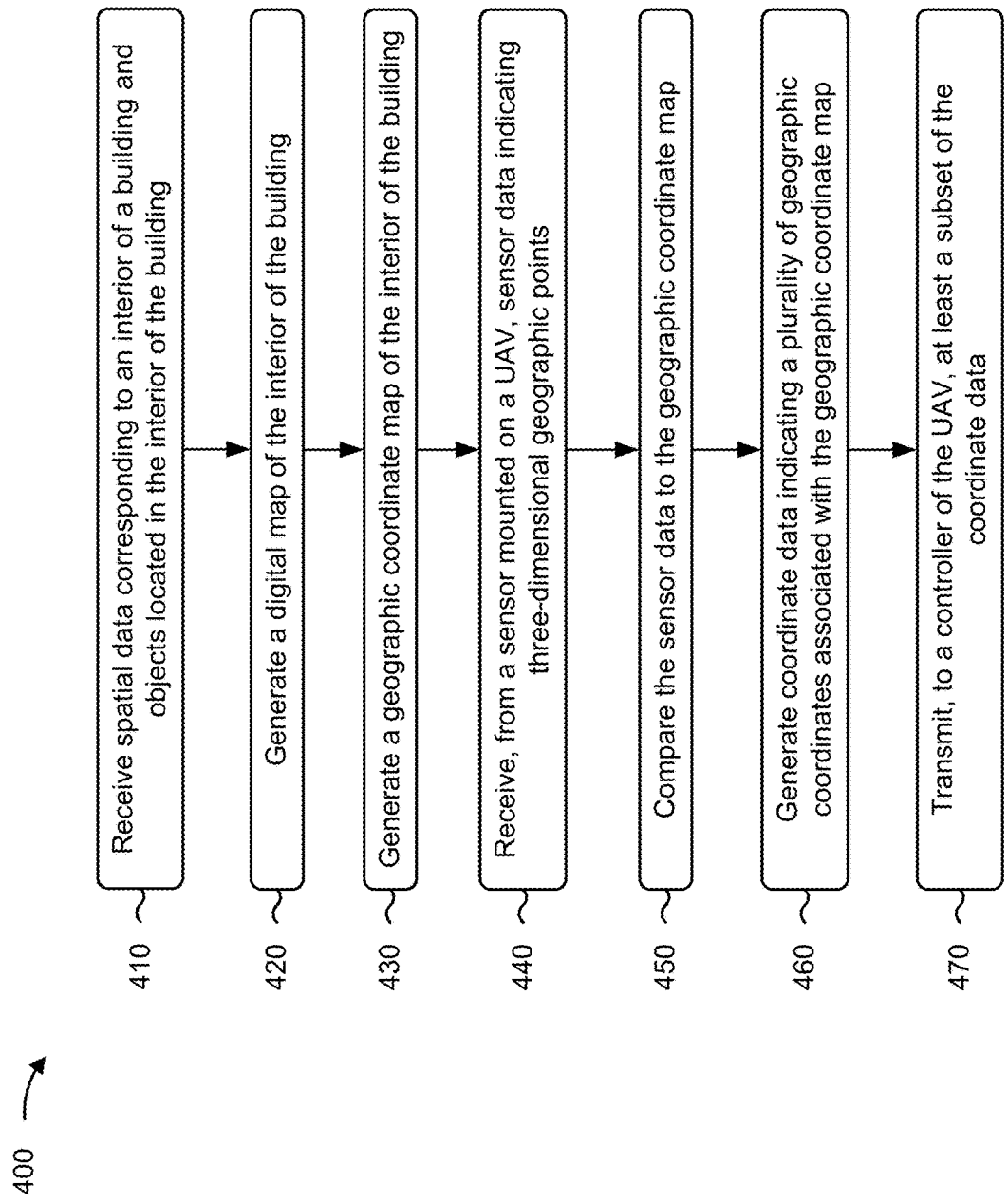

SYSTEMS AND METHODS FOR INDOOR POSITIONING OF UNMANNED AERIAL VEHICLES

BACKGROUND

An uncrewed aerial vehicle (UAV) is a machine capable of flight without a human pilot on board. UAVs may be operated through various means, such as by remote control, autonomously through onboard computers, and/or the like. UAVs have applications in a variety of fields, such as military, scientific, recreational, and commercial sectors.

BRIEF DESCRIPTION OF THE DRAWINGS

FIG. 4 is a flowchart of an example process relating to positioning of UAVs.

DETAILED DESCRIPTION OF EXAMPLE EMBODIMENTS

Figure 1A:
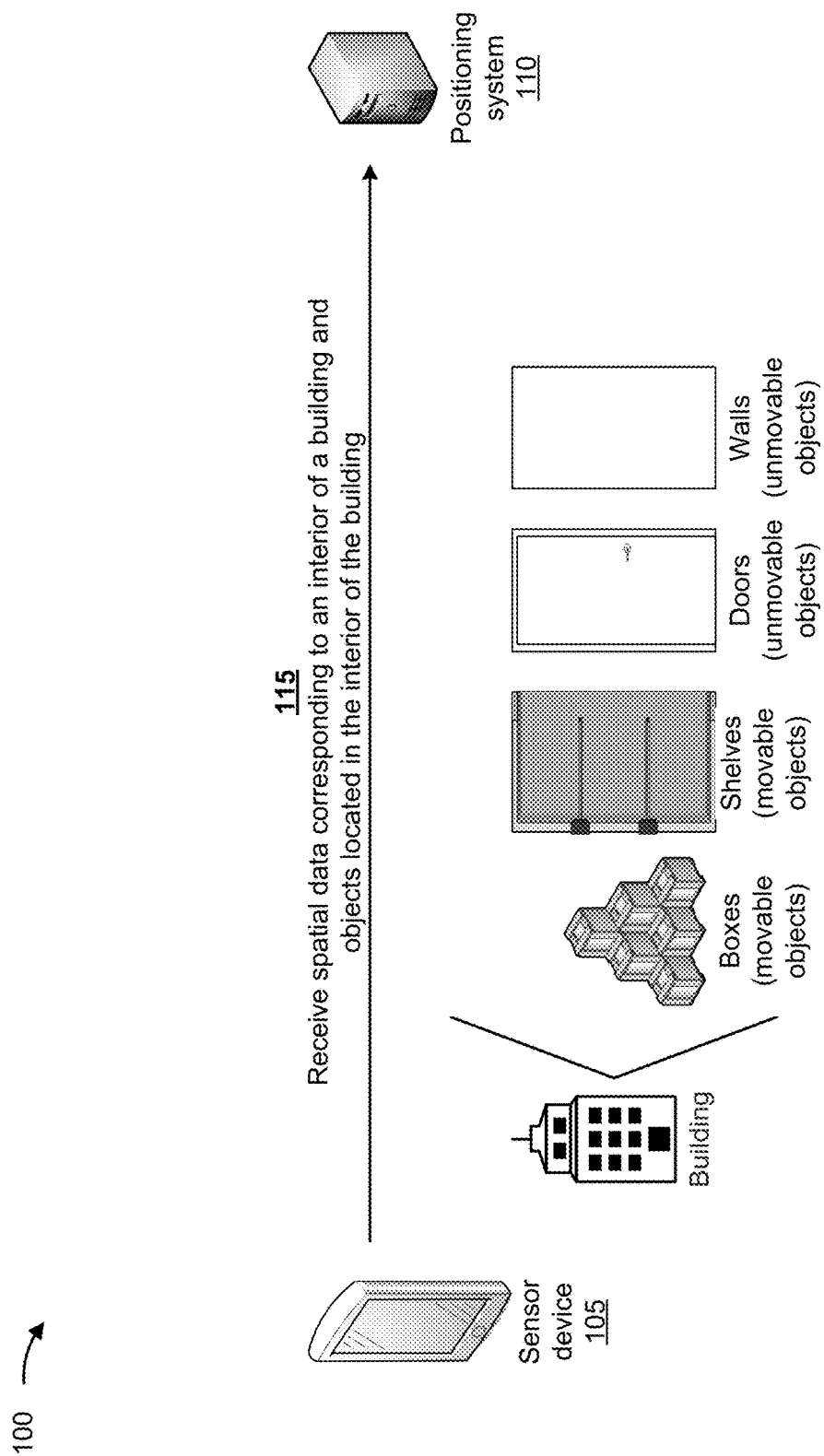
FIGS. 1A-1G are diagrams of an example associated with indoor positioning of UAVs.

The following detailed description of example implementations refers to the accompanying drawings. The same reference numbers in different drawings may identify the same or similar elements.

UAVs, such as drones, are used in various indoor applications (e.g., scanning and/or moving inventory) and/or outdoor applications (e.g., delivering goods). Existing UAV software relies heavily on Global Navigation Satellite System (GNSS), such as Global Positioning System (GPS), for localization, path planning, and waypoint flight in three-dimensional space. However, GPS is generally unavailable for indoor flight, and as a result, the existing UAV software experiences challenges with such localization, path planning, and waypoint flight for the indoor applications (e.g., inaccurate flight paths, unaccounted—for objects and/or obstructions in the indoor space, or the like). Techniques exist for determining relative altitude of the UAV and for maintaining a fixed position of the UAV in indoor environments. However, UAVs do not have onboard systems for accurately tracking movement in the x-y (horizontal) plane, or to move to a new position within the indoor space. Externally mounted cameras may be used to track the indoor movement of UAVs. However, such a solution requires more equipment and calibration, and therefore more computing resources. Accordingly, it is desirable for a system that may utilize existing UAV software to accurately plan and track UAV flight in an indoor environment.

Some implementations herein provide a positioning system that is capable of generating GPS-based indoor flight paths for a UAV. The positioning system may generate a digital map of an indoor environment (e.g., an interior of a building) based on received spatial data, such as from a sensor device (e.g., a light detection and ranging (LIDAR) device). From the digital map, the positioning system may generate a geographic coordinate map of the indoor environment. The positioning system may localize the UAV on the geographic coordinate map, after which the positioning system may generate geographic coordinates for the indoor environment and from which an indoor flight path for the UAV may be generated. The geographic coordinates may be formatted in GPS coordinate format and National Marine Electronics Association (NMEA) format.

In this way, the existing UAV software may be utilized to implement the generated indoor flight path as if it were an outdoor flight path. Accordingly, the positioning system may accurately and efficiently generate a flight path and guide the UAV to various waypoints in the indoor environment, and therefore conserve computing resources (e.g., processing resources, memory resources, communication resources, and/or the like) of the positioning system and the onboard systems of the UAV, networking resources, and/or the like that would otherwise be wasted in providing inaccurate and/or imprecise waypoints and/or flight paths to the waypoints, and then correcting the inaccurate/imprecise waypoints/flight paths in one or more iterations.

FIGS. 1A-1G are diagrams of an example 100 associated with indoor positioning of a UAV. As shown in FIGS. 1A-1G, example 100 includes a sensor device 105, a positioning system 110, and a UAV 130.

The positioning system 110 may including a network computing system, which is discussed in more detail below in connection with FIG. 2. In some implementations, the network computing system may be or may incorporate a multi-access edge computing (MEC) environment or platform. Accordingly, the positioning system 110 may receive and transmit data over a low latency wireless network (e.g., a 5G network). For example, a low latency wireless network may be a network in which a request has a round trip time below a time threshold (e.g., 40 ms).

As shown in FIG. 1A, and by reference number 115, the positioning system 110 may receive, from the sensor device 105, spatial data corresponding to an interior of a building, including objects (e.g., movable objects and unmovable objects) located in the interior of the building. For example, the sensor device 105 may be or may incorporate a spatial sensor, such as a LIDAR device or sensor, to obtain the spatial data. The spatial data may indicate dimensions of the interior of the building and of the objects in the interior of the building and/or distances between the objects. The spatial data may be transmitted to the positioning system 110 as point cloud data. Additionally, or alternatively, the spatial data may include image data indicating images of the interior of the building and objects. The sensor device 105 may capture images or video using one or more sensors, such as one or more cameras, video cameras, and/or recorders.

The interior of the building may have one or more movable or unmovable objects. Movable objects may include objects that are identified as temporary installments, nonfixed objects, and/or objects likely to move within a threshold period of time. For example, movable objects may include objects such as boxes, crates, and/or shelves. In some implementations, a movable object may have a property, such as a color of the object (e.g., color of a wall) that may be subject to change at a particular frequency, within a particular threshold of time, periodically, and/or the like. Unmovable objects may include objects that are typically considered permanent fixtures in a building, fixtures that are unlikely to change or move within a threshold distance (e.g., although some unmovable objects may rotate or move around, such as chairs) or period of time (e.g., a year, a decade, and/or the like), and/or fixtures that are unlikely to change at a particular frequency. For example, unmovable objects may include doors, windows, walls, support beams, and/or the like. The examples listed above are not intended to limit or restrict the concept of a movable and/or unmovable object, and are merely intended to illustrate the concepts. In some implementations, the concept of a movable and/or unmovable object may be particular to a type of setting, building, and/or the like. That is, movable objects in one setting may be considered unmovable objects in another setting.

Figure 1B:
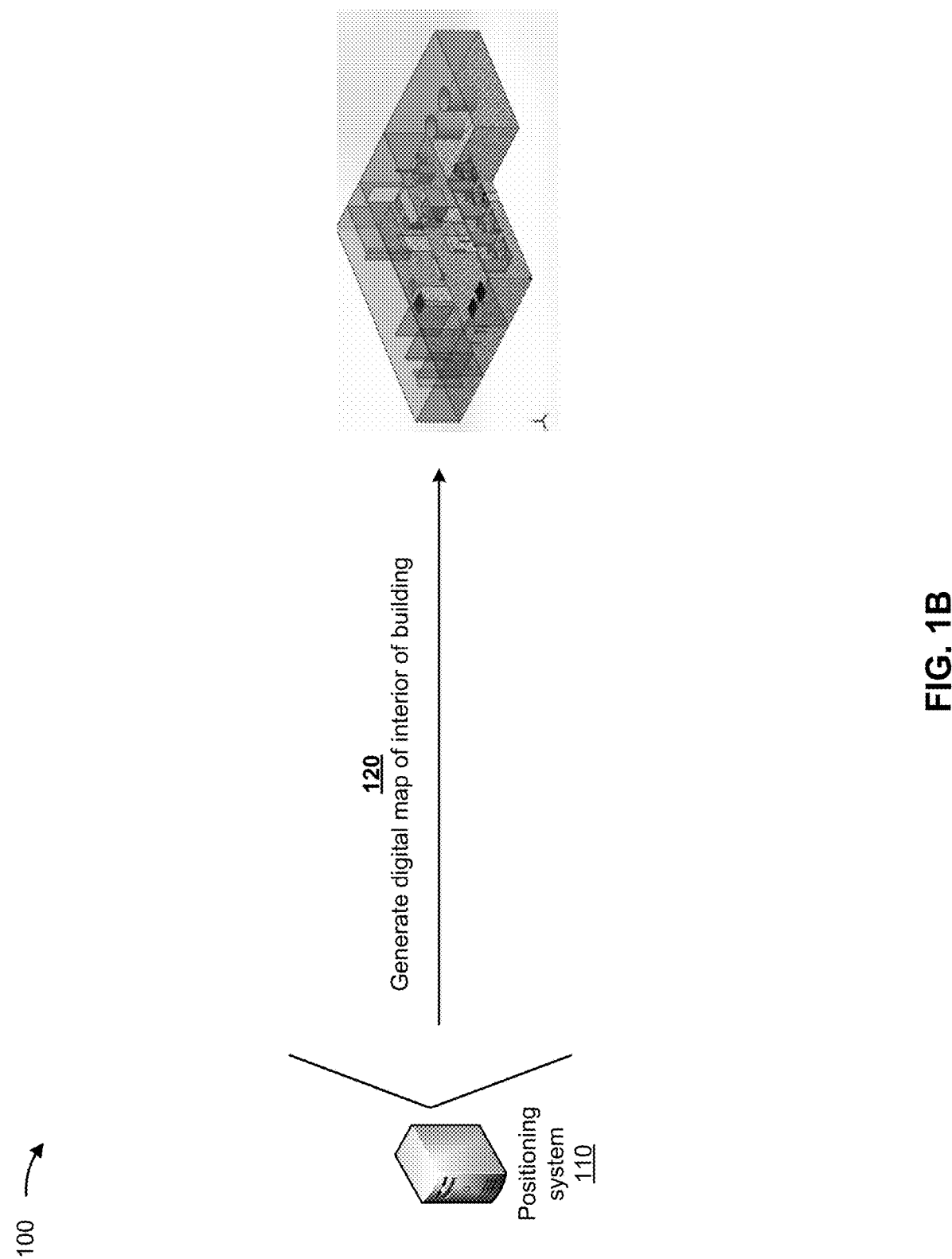

As shown in FIG. 1B, and by reference number 120, the positioning system 110 may generate a digital map (e.g., a point cloud map) of the interior of the building based on the spatial data (e.g., point cloud data) received from the sensor device 105. The digital map may include a first grid based on an XYZ coordinate system. For example, the digital map may include a number of points that are referenced based on the XYZ coordinate system. The digital map may include movable objects and/or unmovable objects.

In some implementations, the positioning system 110 may store the digital map. For example, the positioning system 110 may store the digital map in a local data structure accessible over a local network, as described in more detail below. Additionally, or alternatively, the positioning system 110 may store the digital map in a network computing environment that is accessible over a low latency wireless network.

Figure 1C:
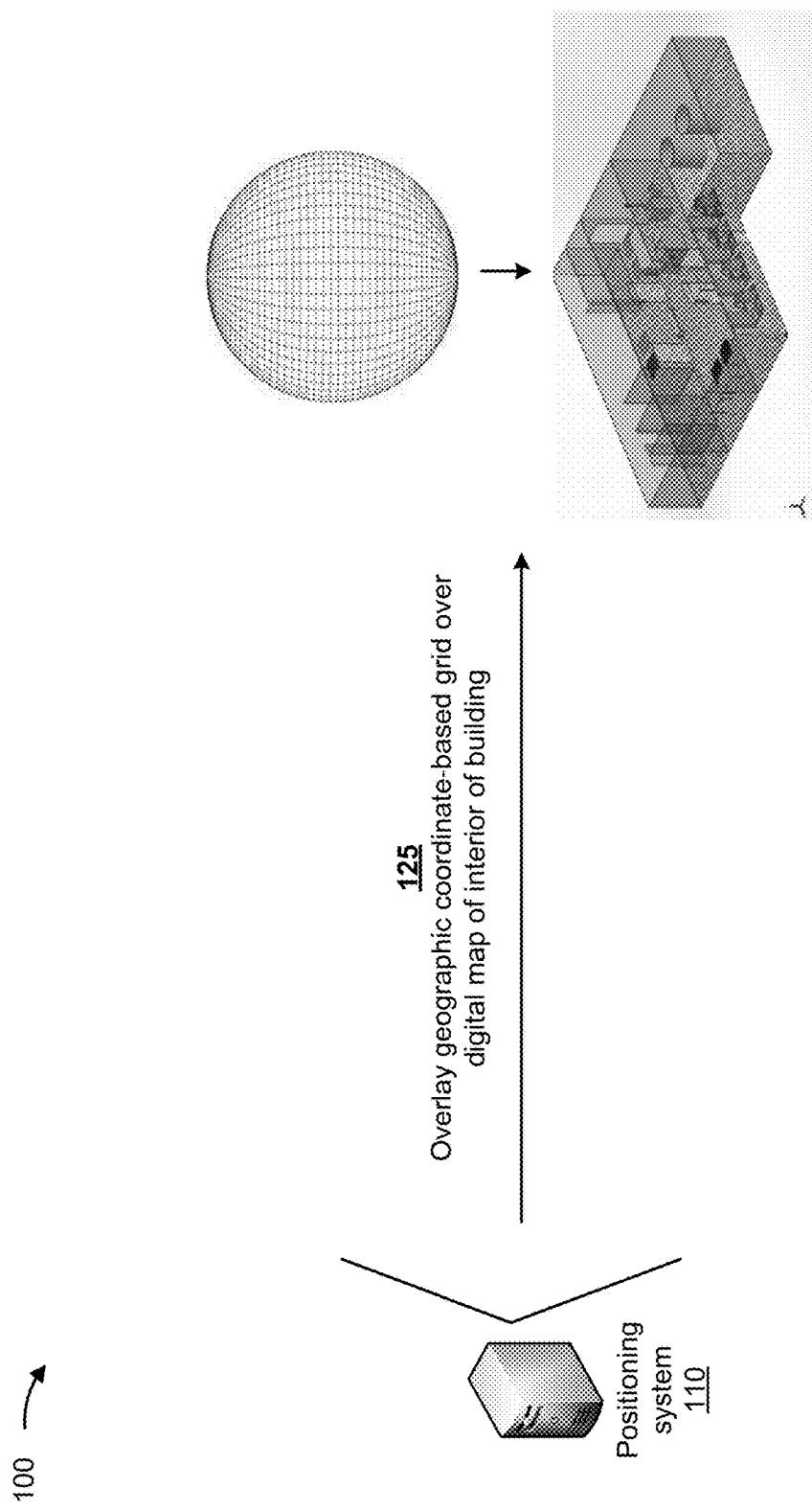

As shown in FIG. 1C, and by reference number 125, the positioning system 110 may overlay a geographic coordinate-based grid (also referred to as a second grid) over the digital map of the interior of the building. The second grid may be based on a geographic coordinate system. As a result, a geographic coordinate map of the interior of the building is formed, and points on the geographic coordinate map may be referenced by geographic coordinates (e.g., longitude and latitude). In some implementations, the second grid may be additionally based on altitude, such that points on the geographic coordinate map may have an altitude component in addition to longitude and latitude components. The geographic coordinates of points in the geographic coordinate map are mapped to the digital map generated from the spatial data. As a result, the geographic coordinate (e.g., the longitude and latitude components) of a particular point in the grid may or may not reflect the actual geographic coordinate (e.g., the global longitude and latitude coordinates) of the particular point. Rather, the longitude and latitude components may be specific only relative to the interior of the building.

Figure 1D:
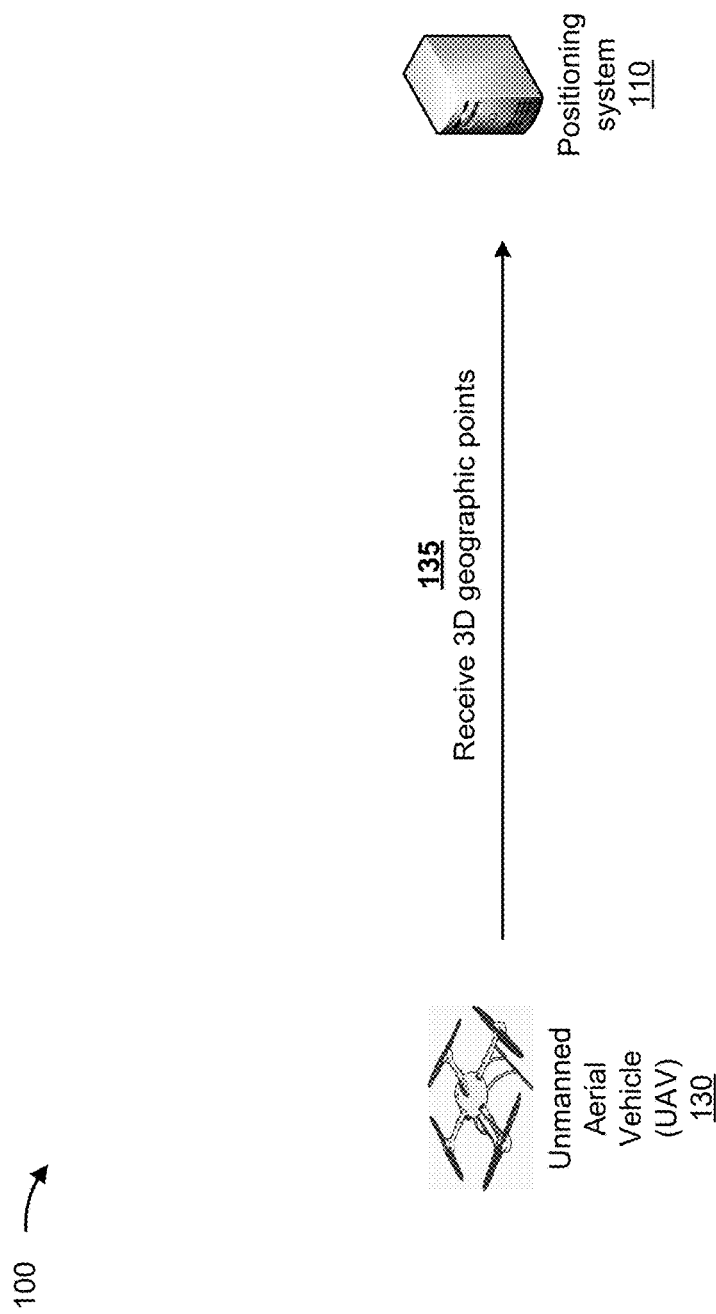

As shown in FIG. 1D, and by reference number 135, the positioning system 110 may receive, from the UAV 130, three-dimensional geographic points. In some implementations, the positioning system 110 may receive the three-dimensional geographic points from a sensor device mounted on the UAV 130. For example, the sensor device may be a LIDAR device or sensor. In some implementations in which the processing system 110 includes a MEC environment, the sensor data may be sent by the UAV 130, and received by the positioning system 110, over a low latency wireless network.

Figure 1E:
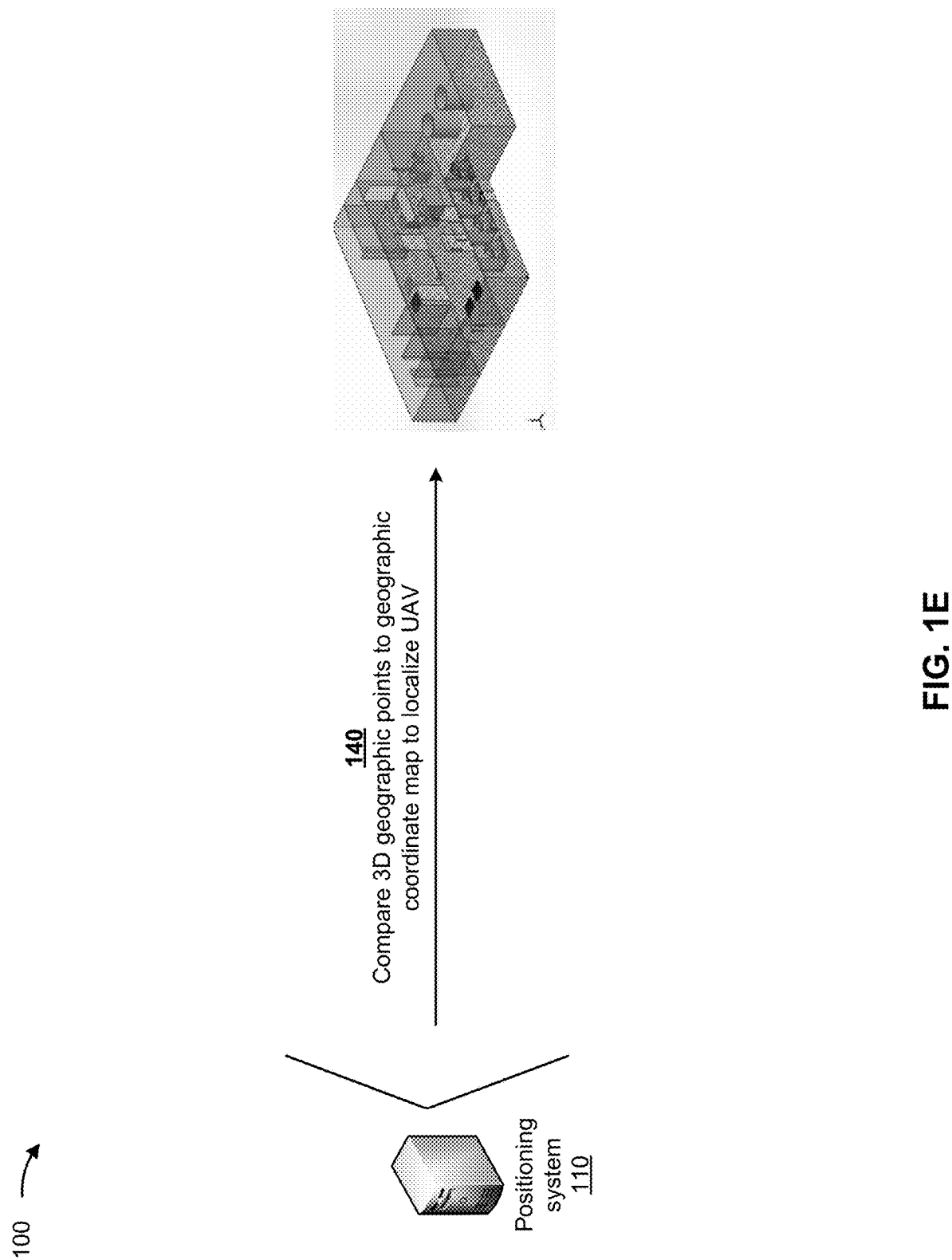

As shown in FIG. 1E, and by reference number 140, the positioning system 110 may compare the three-dimensional geographic points to the geographic coordinate map to localize the UAV 130. In some implementations, the positioning system 110 may implement map matching algorithms that may compare the real-time data indicating the three-dimensional geographic points to the digital map.

Figure 1F:
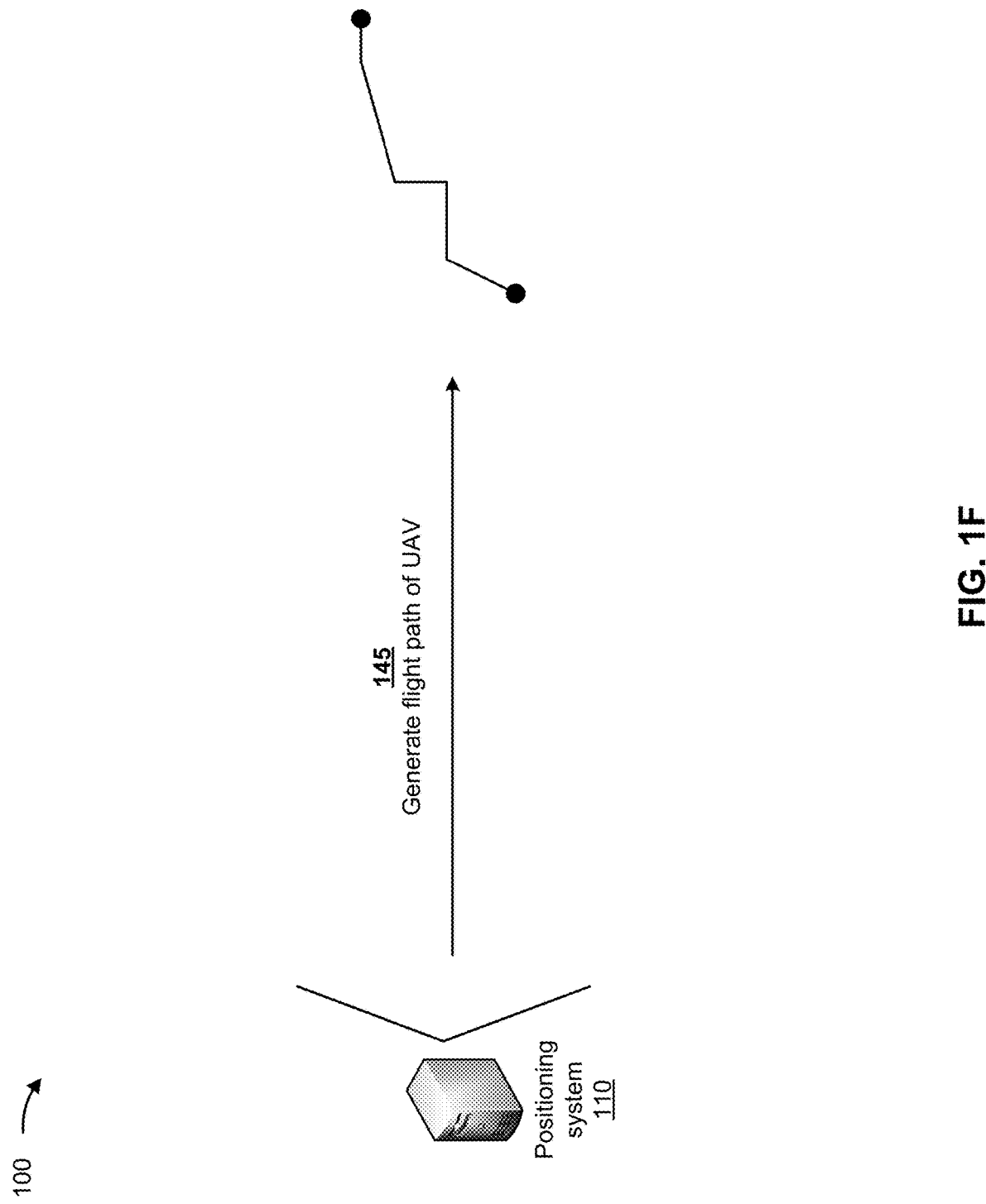

As shown in FIG. 1F, and by reference number 145, the positioning system 110 may generate a flight path of the UAV 130 (e.g., from a starting point to an end point). For example, after localizing the UAV 130 on the geographic coordinate map, the positioning system 110 may generate coordinate data indicating a plurality of geographic coordinates associated with the geographic coordinate map. The geographic coordinates may be formatted in global positioning system (GPS) format and/or National Marine Electronics Association (NMEA) format. The flight path may include a plurality of waypoints, which may correspond to at least a subset of the geographic coordinates. Accordingly, the waypoints may have longitude and latitude components. In some implementations, the waypoints may include an altitude component in addition to the longitude and latitude components.

Figure 1G:
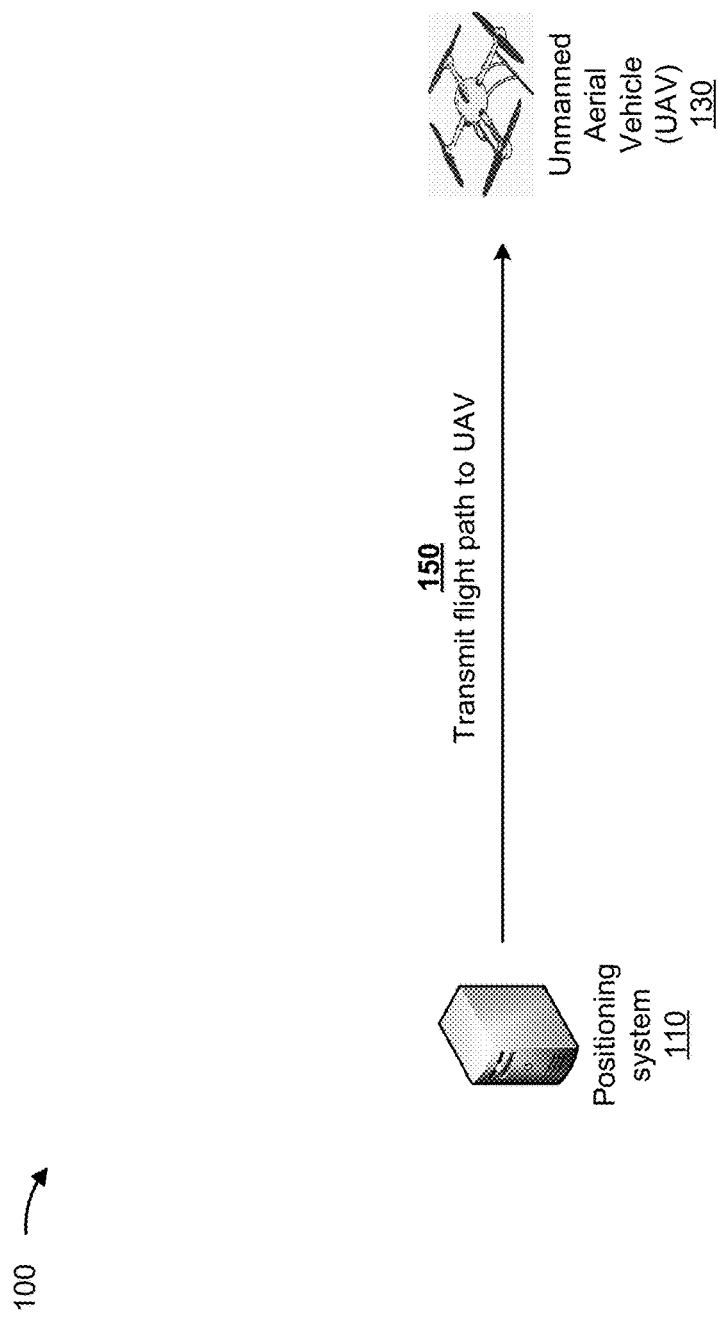

As shown in FIG. 1G, and by reference number 150, the positioning system 110 may transmit flight path data, indicating the flight path, to the UAV 130 (e.g., to a controller of the UAV 130). In some implementations in which the processing system 110 includes a MEC environment, the positioning system 110 may transmit the flight path data to the UAV 130 over a low latency wireless network. Accordingly, because of the low latency, the flight path data may be transmitted to the UAV 130 in real-time or near-real-time such that the UAV 130 may have an accurate flight path along which to follow when in route. Additionally, because the geographic coordinates indicated by the coordinate data are in the format of GPS and/or NMEA, the UAV 130 may be able to read, process, and follow the flight path without any additional equipment and/or modification to the existing UAV software.

Additionally, the positioning system 110 may determine a bearing of the UAV 130, which may be included in the flight path data. The positioning system 110 may determine the bearing of the UAV 130 based on an orientation of the sensor mounted on the UAV and/or on the geographic coordinate map. For example, in implementations in which the sensor is a LIDAR sensor, the LIDAR sensor may have angles of beams included in the sensor data transmitted to the positioning system 110. The positioning system 110 may be able to determine the bearing of the UAV 130 based on the angles of beams indicated in the sensor data.

As explained above, the positioning system 110 may generate a map of the interior of a building based on the geographic coordinate system. The positioning system 110 may generate an indoor flight path that includes waypoints with geographic coordinates formatted in GPS coordinate format and NMEA format. As a result, existing UAV software may be utilized to implement the generated indoor flight path as if it were an outdoor flight path. Accordingly, the processing system may accurately and efficiently generate an indoor flight path and guide the UAV 130 to various waypoints in an indoor environment, and therefore conserve computing resources (e.g., processing resources, memory resources, communication resources, and/or the like) of the positioning system 110 and the onboard systems of the UAV 130, networking resources, and/or the like that would otherwise be wasted in providing inaccurate and/or imprecise waypoints and/or flight paths to the waypoints, and then correcting the inaccurate/imprecise waypoints/flight paths in one or more iterations.

As indicated above, FIGS. 1A-1G are provided as an example. Other examples may differ from what is described with regard to FIGS. 1A-1G. The number and arrangement of devices shown in FIGS. 1A-1G are provided as an example. In practice, there may be additional devices, fewer devices, different devices, or differently arranged devices than those shown in FIGS. 1A-1G. Furthermore, two or more devices shown in FIGS. 1A-1G may be implemented within a single device, or a single device shown in FIGS. 1A-1G may be implemented as multiple, distributed devices.

Additionally, or alternatively, a set of devices (e.g., one or more devices) shown in FIGS. 1A-1G may perform one or more functions described as being performed by another set of devices shown in FIGS. 1A-1G.

Figure 2:
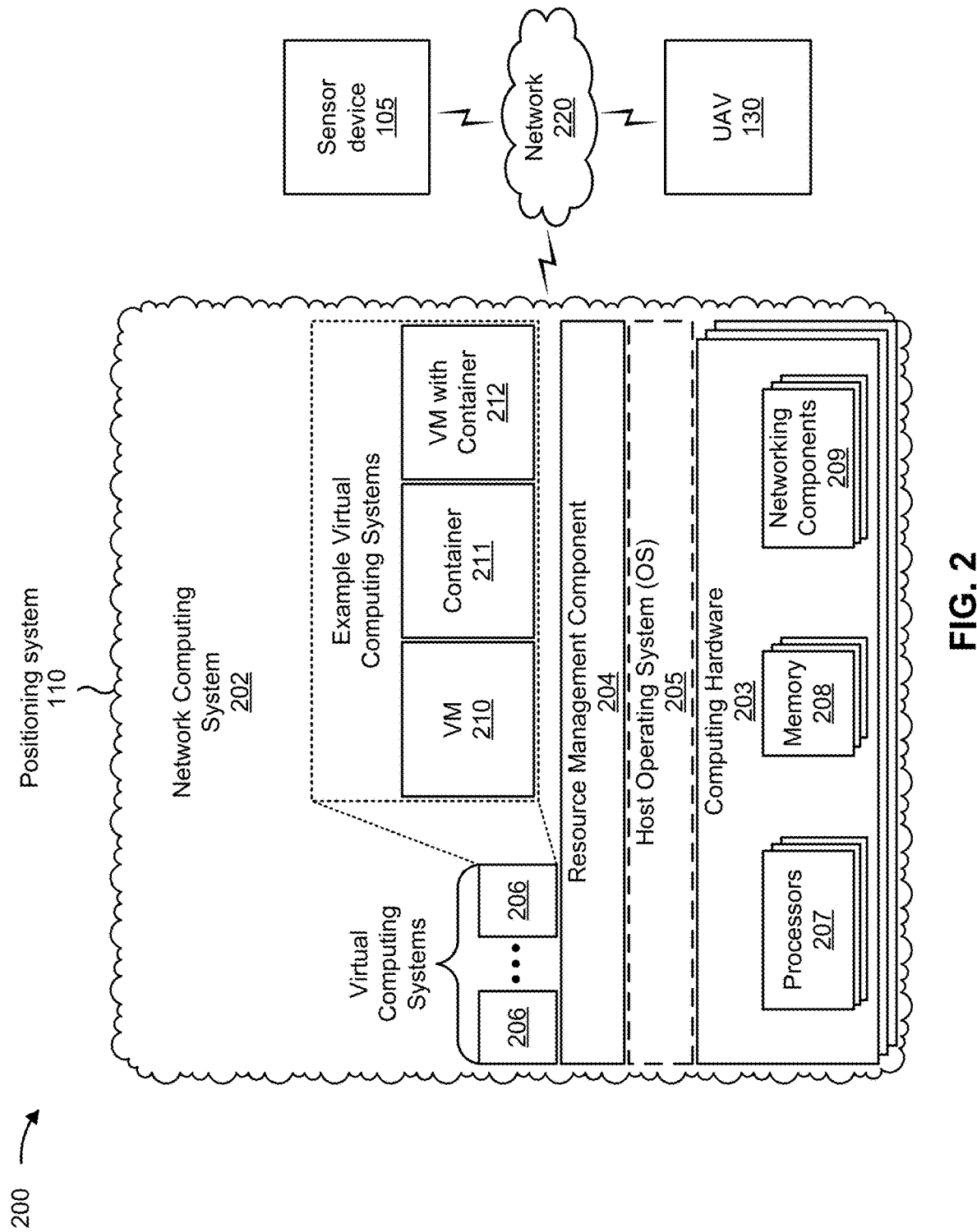
FIG. 2 is a diagram of an example environment in which systems and/or methods described herein may be implemented.

FIG. 2 is a diagram of an example environment 200 in which systems and/or methods described herein may be implemented. As shown in FIG. 2, environment 200 may include a positioning system 110, which may include one or more elements of and/or may execute within a computing system 202. The computing system 202 may include one or more elements 203-212, as described in more detail below. As further shown in FIG. 2, environment 200 may include the sensor 105, the UAV 130, and/or a network 220. Devices and/or elements of environment 200 may interconnect via wired connections and/or wireless connections.

The sensor device 105 includes one or more wired or wireless devices capable of receiving, generating, storing, transmitting, processing, detecting, and/or providing information associated with indoor positioning of a UAV, as described elsewhere herein. For example, the sensor device 105 may include a spatial sensor (e.g., a LIDAR sensor and/or device), a light sensor, an ultrasonic sensor, a positioning sensor, an infrared sensor, an active sensor (e.g., a sensor that requires an external power signal), a passive sensor (e.g., a sensor that does not require an external power signal), a radioactive sensor, a magnetic sensor, an electromagnetic sensor, an analog sensor, and/or a digital sensor, among other examples. The sensor device 105 may sense or detect a condition or information and transmit, using a wired or wireless communication interface, an indication of the detected condition or information to other devices in the environment 200.

UAV 130 includes an autonomous aerial vehicle capable of autonomous flight and receiving, generating, storing, transmitting, processing, and/or providing information associated with traversing a flight path to perform a service. For example, UAV 130 may include an aerial vehicular device equipped with communication and/or computing equipment, such as an uncrewed aerial vehicle (e.g., a drone or a quadcopter), and/or the like. In some implementations, UAV 130 may include an aircraft that has an area for at least one human passenger but is uncrewed by way of the control of the aircraft being autonomous and not performed by a human.

UAV 130 may include one or more sensors configured to determine the location and/or route of the UAV 130 for navigating UAV 130 to perform a service. For example, UAV 130 may include GNSS receivers, including receivers for GPS, GLONASS, Galileo, BeiDou, and/or other satellite systems. In some implementations, UAV 130 may be equipped with a LIDAR device and/or sensor (e.g., a 360 degree LIDAR sensor or a 180 degree LIDAR sensor). UAV 130 may be programmed with travel routes, coordinates, and/or the like.

The network computing system 202 includes computing hardware 203, a resource management component 204, a host operating system (OS) 205, and/or one or more virtual computing systems 206. The network computing system 202 may execute on, for example, an Amazon Web Services platform, a Microsoft Azure platform, or a Snowflake platform. The resource management component 204 may perform virtualization (e.g., abstraction) of computing hardware 203 to create the one or more virtual computing systems 206. Using virtualization, the resource management component 204 enables a single computing device (e.g., a computer or a server) to operate like multiple computing devices, such as by creating multiple isolated virtual computing systems 206 from computing hardware 203 of the single computing device. In this way, computing hardware 203 can operate more efficiently, with lower power consumption, higher reliability, higher availability, higher utilization, greater flexibility, and lower cost than using separate computing devices. In some implementations, the network computing system 202 may be or may incorporate a MEC environment. In some implementations, the network computing system 202 may be or may incorporate a cloud computing environment.

Computing hardware 203 includes hardware and corresponding resources from one or more computing devices. For example, computing hardware 203 may include hardware from a single computing device (e.g., a single server) or from multiple computing devices (e.g., multiple servers), such as multiple computing devices in one or more data centers. As shown, computing hardware 203 may include one or more processors 207, one or more memories 208, and/or one or more networking components 209. Examples of a processor, a memory, and a networking component (e.g., a communication component) are described elsewhere herein.

The resource management component 204 includes a virtualization application (e.g., executing on hardware, such as computing hardware 203) capable of virtualizing computing hardware 203 to start, stop, and/or manage one or more virtual computing systems 206. For example, the resource management component 204 may include a hypervisor (e.g., a bare-metal or Type 1 hypervisor, a hosted or Type 2 hypervisor, or another type of hypervisor) or a virtual machine monitor, such as when the virtual computing systems 206 are virtual machines 210. Additionally, or alternatively, the resource management component 204 may include a container manager, such as when the virtual computing systems 206 are containers 211. In some implementations, the resource management component 204 executes within and/or in coordination with a host operating system 205.

A virtual computing system 206 includes a virtual environment that enables cloud-based execution of operations and/or processes described herein using computing hardware 203. As shown, a virtual computing system 206 may include a virtual machine 210, a container 211, or a hybrid environment 212 that includes a virtual machine and a container, among other examples. A virtual computing system 206 may execute one or more applications using a file system that includes binary files, software libraries, and/or other resources required to execute applications on a guest operating system (e.g., within the virtual computing system 206) or the host operating system 205.

Although the positioning system 201 may include one or more elements 203-212 of the network computing system 202, may execute within the network computing system 202, and/or may be hosted within the network computing system 202, in some implementations, the positioning system 201 may not be cloud-based (e.g., may be implemented outside of a network computing system) or may be partially cloud-based. For example, the positioning system 201 may include one or more devices that are not part of the network computing system 202, such as device 300 of FIG. 3, which may include a standalone server or another type of computing device. The positioning system 201 may perform one or more operations and/or processes described in more detail elsewhere herein.

Network 220 includes one or more wired and/or wireless networks. For example, network 220 may include a low latency wireless network, a cellular network, a public land mobile network (PLMN), a local area network (LAN), a wide area network (WAN), a private network, the Internet, and/or a combination of these or other types of networks. The network 220 enables communication among the devices of environment 200.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
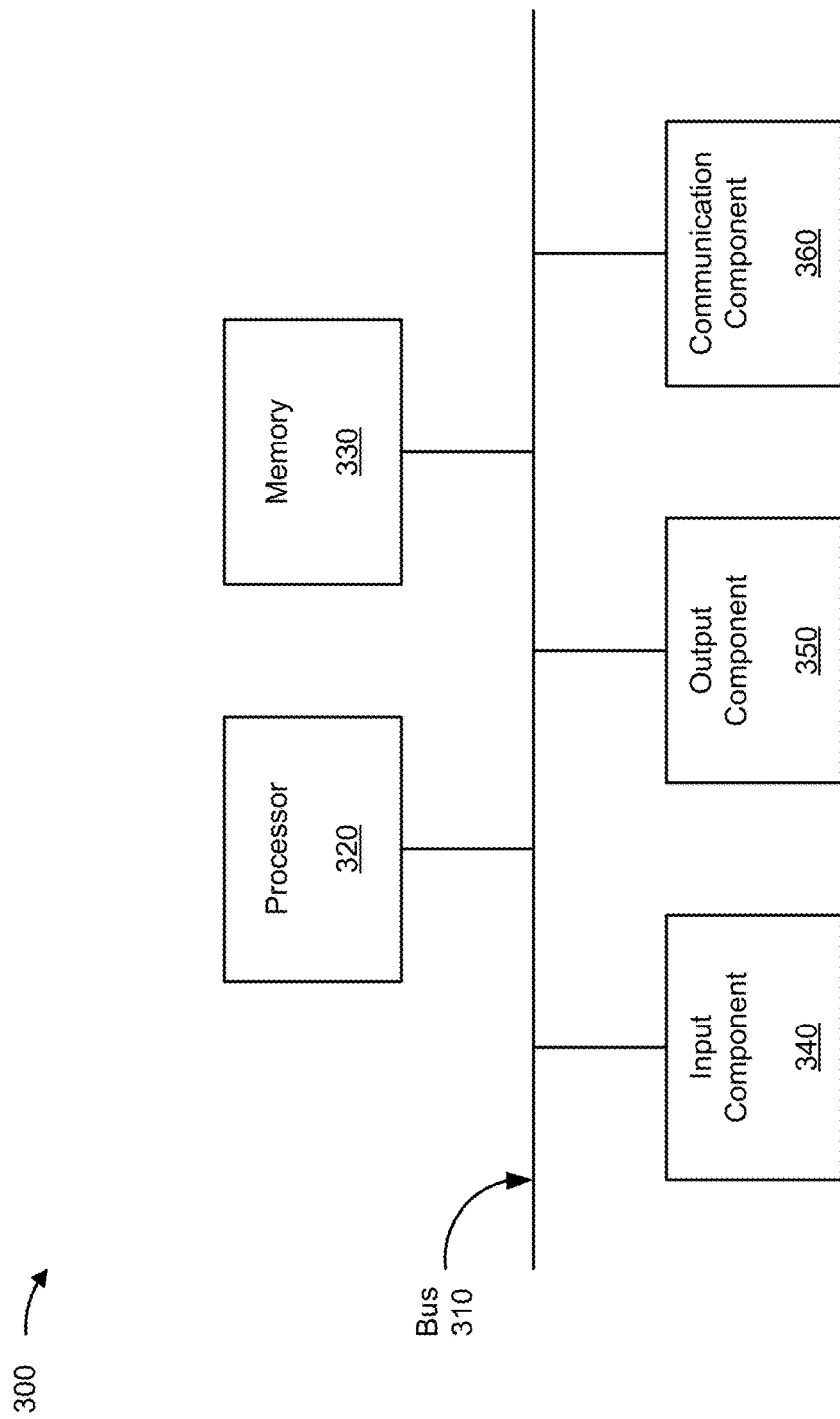
FIG. 3 is a diagram of example components of one or more devices of FIG. 2.

FIG. 3 is a diagram of example components of a device 300, which may correspond to sensor device 105 and/or UAV 130. In some implementations, sensor device 105 and/or UAV 130 include one or more devices 300 and/or one or more components of device 300. As shown in FIG. 3, device 300 may include a bus 310, a processor 320, a memory 330, an input component 340, an output component 350, and a communication component 360.

Bus 310 includes one or more components that enable wired and/or wireless communication among the components of device 300. Bus 310 may couple together two or more components of FIG. 3, such as via operative coupling, communicative coupling, electronic coupling, and/or electric coupling. Processor 320 includes a central processing unit, a graphics processing unit, a microprocessor, a controller, a microcontroller, a digital signal processor, a field-programmable gate array, an application-specific integrated circuit, and/or another type of processing component. Processor 320 is implemented in hardware, firmware, or a combination of hardware and software. In some implementations, processor 320 includes one or more processors capable of being programmed to perform one or more operations or processes described elsewhere herein.

Memory 330 includes volatile and/or nonvolatile memory. For example, memory 330 may include random access memory (RAM), read only memory (ROM), a hard disk drive, and/or another type of memory (e.g., a flash memory, a magnetic memory, and/or an optical memory). Memory 330 may include internal memory (e.g., RAM, ROM, or a hard disk drive) and/or removable memory (e.g., removable via a universal serial bus connection). Memory 330 may be a non-transitory computer-readable medium. Memory 330 stores information, instructions, and/or software (e.g., one or more software applications) related to the operation of device 300. In some implementations, memory 330 includes one or more memories that are coupled to one or more processors (e.g., processor 320), such as via bus 310.

Input component 340 enables device 300 to receive input, such as user input and/or sensed input. For example, input component 340 may include a touch screen, a keyboard, a keypad, a mouse, a button, a microphone, a switch, a sensor, a global positioning system sensor, an accelerometer, a gyroscope, and/or an actuator. Output component 350 enables device 300 to provide output, such as via a display, a speaker, and/or a light-emitting diode. Communication component 360 enables device 300 to communicate with other devices via a wired connection and/or a wireless connection. For example, communication component 360 may include a receiver, a transmitter, a transceiver, a modem, a network interface card, and/or an antenna.

Device 300 may perform one or more operations or processes described herein. For example, a non-transitory computer-readable medium (e.g., memory 330) may store a set of instructions (e.g., one or more instructions or code) for execution by processor 320. Processor 320 may execute the set of instructions to perform one or more operations or processes described herein. In some implementations, execution of the set of instructions, by one or more processors 320, causes the one or more processors 320 and/or the device 300 to perform one or more operations or processes described herein. In some implementations, hardwired circuitry is used instead of or in combination with the instructions to perform one or more operations or processes described herein. Additionally, or alternatively, processor 320 may be configured to perform one or more operations or processes described herein. Thus, implementations described herein are not limited to any specific combination of hardware circuitry and software.

The number and arrangement of components shown in FIG. 3 are provided as an example. Device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

FIG. 4 is a flowchart of an example process 400 associated with indoor positioning of a UAV. In some implementations, one or more process blocks of FIG. 4 may be performed by a device (e.g., positioning system 110). Additionally, or alternatively, one or more process blocks of FIG. 4 may be performed by one or more components of device 300, such as processor 320, memory 330, input component 340, output component 350, and/or communication component 360.

As shown in FIG. 4, process 400 may include receiving spatial data corresponding to an interior of a building and objects located in the interior of the building (block 410). For example, the device may receive spatial data corresponding to an interior of a building and objects located in the interior of the building, as described above.

As further shown in FIG. 4, process 400 may include generating a digital map of the interior of the building based on the spatial data (block 420). For example, the device may generate a digital map of the interior of the building based on the spatial data, as described above. In some implementations, the digital map includes a first grid based on an XYZ coordinate system. In some implementations, process 400 includes storing the digital map in a network computing environment that is accessible over a low latency wireless network. In some implementations, the network computing environment is a multi-access edge computing (MEC) environment.

As further shown in FIG. 4, process 400 may include generating a geographic coordinate map of the interior of the building (block 430). For example, the device may overlay a second grid over the digital map to generate a geographic coordinate map of the interior of the building, as described above. In some implementations, the second grid is based on a geographic coordinate system.

As further shown in FIG. 4, process 400 may include receiving, from a sensor mounted on a UAV, sensor data indicating three-dimensional geographic points (block 440). For example, the device may receive, from a sensor mounted on a UAV, sensor data indicating three-dimensional geographic points, as described above. In some implementations, the sensor data is received over a low latency wireless network. In some implementations, the sensor data is received from a 360 degree LIDAR sensor or a 180 degree LIDAR sensor of the UAV. In some implementations, process 400 includes determining a bearing of the UAV based on an orientation of the sensor mounted on the UAV.

As further shown in FIG. 4, process 400 may include comparing the sensor data to the geographic coordinate map to localize the UAV on the geographic coordinate map (block 450). For example, the device may compare the sensor data to the geographic coordinate map to localize the UAV on the geographic coordinate map, as described above.

As further shown in FIG. 4, process 400 may include generating coordinate data indicating a plurality of geographic coordinates associated with the geographic coordinate map (block 460). For example, the device may generate, after localizing the UAV on the geographic coordinate map, coordinate data indicating a plurality of geographic coordinates associated with the geographic coordinate map, as described above. In some implementations, the plurality of geographic coordinates are formatted in a GPS coordinate format, and an NMEA format.

As further shown in FIG. 4, process 400 may include transmitting, to a controller of the UAV, at least a subset of the coordinate data (block 470). For example, the device may transmit, to a controller of the UAV, at least a subset of the coordinate data, as described above.

In some implementations, process 400 includes determining a flight path for the UAV. The flight path may include a plurality of waypoints, and the plurality of waypoints may correspond to a subset of the plurality of geographic coordinates. Transmitting the at least a subset of the coordinate data may include transmitting, to the controller of the UAV, flight path data indicating the flight path.

In some implementations, process 400 includes receiving, from an altitude sensor of the UAV, altitude data corresponding to an altitude of the UAV. The plurality of waypoints, of the flight path, may include an altitude component.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

As used herein, the term "component" is intended to be broadly construed as hardware, firmware, or a combination of hardware and software. It will be apparent that systems and/or methods described herein may be implemented in different forms of hardware, firmware, and/or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be used to implement the systems and/or methods based on the description herein.

As used herein, satisfying a threshold may, depending on the context, refer to a value being greater than the threshold, greater than or equal to the threshold, less than the threshold, less than or equal to the threshold, equal to the threshold, not equal to the threshold, or the like.

To the extent the aforementioned implementations collect, store, or employ personal information of individuals, it should be understood that such information shall be used in accordance with all applicable laws concerning protection of personal information. Additionally, the collection, storage, and use of such information can be subject to consent of the individual to such activity, for example, through well known "opt-in" or "opt-out" processes as can be appropriate for the situation and type of information. Storage and use of personal information can be in an appropriately secure manner reflective of the type of information, for example, through various encryption and anonymization techniques for particularly sensitive information.

Even though particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiple of the same item.

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

In the preceding specification, various example embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

What is claimed is:

1. A method, comprising:
   receiving, by a device, spatial data corresponding to an interior of a building and objects located in the interior of the building;
   generating, by the device, a digital map of the interior of the building based on the spatial data,
      wherein the digital map includes a first grid based on an XYZ coordinate system;
   overlaying, by the device, a second grid over the digital map to generate a geographic coordinate map of the interior of the building, wherein the second grid is based on a geographic coordinate system,
wherein the geographic coordinate system includes longitude and latitude components that are relative to the interior of the building;
receiving, by the device and from a sensor mounted on an uncrewed aerial vehicle (UAV), sensor data indicating three-dimensional geographic points;
comparing, by the device, the sensor data to the geographic coordinate map to localize the UAV on the geographic coordinate map;
generating, by the device and after localizing the UAV on the geographic coordinate map, coordinate data indicating a plurality of geographic coordinates associated with the geographic coordinate map,
wherein the plurality of geographic coordinates are formatted in a global positioning system (GPS) coordinate format, and a National Marine Electronics Association (NMEA) format; and
transmitting, by the device and to a controller of the UAV, at least a subset of the coordinate data,
wherein transmitting the at least the subset of the coordinate data includes:
transmitting, to the controller of the UAV, flight path data indicating an indoor flight path.

2. The method of claim 1, wherein the sensor data is received over a low latency wireless network.

3. The method of claim 1, further comprising:
storing the digital map in a network computing environment that is accessible over a low latency wireless network.

4. The method of claim 3, wherein the network computing environment is a multi-access edge computing (MEC) environment.

5. The method of claim 1, wherein receiving the sensor data comprises:
receiving the sensor data from a 360 degree light detection and ranging (LIDAR) sensor or a 180 degree LIDAR sensor of the UAV.

6. The method of claim 1, further comprising:
determining a flight path for the UAV,
wherein the flight path includes a plurality of waypoints, and the plurality of waypoints correspond to a subset of the plurality of geographic coordinates.

7. The method of claim 6, further comprising:
receiving, from an altitude sensor of the UAV, altitude data corresponding to an altitude of the UAV,
wherein the plurality of waypoints include an altitude component.

8. The method of claim 1, further comprising:
determining a bearing of the UAV based on an orientation of the sensor mounted on the UAV.

9. A device, comprising:
one or more processors configured to:
receive spatial data corresponding to an interior of a building and objects located in the interior of the building;
generate a digital map of the interior of the building based on the spatial data,
wherein the digital map includes a plurality of points referenced based on an XYZ coordinate system;
store the digital map in a data structure,
wherein the digital map is accessible over a local network or low latency wireless network;
overlay a grid over the digital map to generate a geographic coordinate map of the interior of the building,
wherein the grid is based on latitude, longitude, and altitude components that are relative to the interior of the building;
localize an uncrewed aerial vehicle (UAV) on the geographic coordinate map;
generate, after localizing the UAV on the geographic coordinate map, coordinate data indicating a plurality of geographic coordinates associated with the geographic coordinate map,
wherein the plurality of geographic coordinates are formatted in a global positioning system (GPS) coordinate format, and a National Marine Electronics Association (NMEA) format; and
transmit, to a controller of the UAV, at least a subset of the coordinate data,
wherein the one or more processors, to transmit the at least the subset of the coordinate data, are to:
transmit, to the controller of the UAV, flight path data indicating an indoor flight path.

10. The device of claim 9, wherein the one or more processors are further configured to:
determine a flight path for the UAV,
wherein the flight path includes a plurality of waypoints, and the plurality of waypoints correspond to a subset of the plurality of geographic coordinates.

11. The device of claim 10, wherein the one or more processors are further configured to:
receive, from an altitude sensor of the UAV, altitude data corresponding to an altitude of the UAV,
wherein the plurality of waypoints include an altitude component.

12. The device of claim 9, wherein the one or more processors, when localizing the UAV on the geographic coordinate map, are configured to:
receive, from a sensor mounted on the UAV, sensor data indicating three-dimensional geographic points; and
compare the sensor data to the geographic coordinate map.

13. The device of claim 12, wherein the one or more processors, when receiving the sensor data, are configured to:
receive the sensor data from a 360 degree light detection and ranging (LIDAR) sensor or a 180 degree LIDAR sensor of the UAV.

14. The device of claim 9, wherein the data structure is in a network computing environment that is accessible over the low latency wireless network.

15. The device of claim 14, wherein the network computing environment is a multi-access edge computing (MEC) environment.

16. A non-transitory computer-readable medium storing a set of instructions, the set of instructions comprising:
one or more instructions that, when executed by one or more processors of a device, cause the device to:
receive spatial data corresponding to an interior of a building and objects located in the interior of the building;
generate a digital map of the interior of the building based on the spatial data,
wherein the digital map includes a first grid based on an XYZ coordinate system;
overlay a second grid over the digital map to generate a geographic coordinate map of the interior of the building,
wherein the second grid is based on a geographic coordinate system, wherein the geographic coordinate system includes longitude and latitude components that are relative to the interior of the building;
localize an uncrewed aerial vehicle (UAV) on the geographic coordinate map;
generate, based on localizing the UAV on the geographic coordinate map, a flight path for the UAV in the interior of the building,
  wherein the flight path includes a plurality of waypoints, and the plurality of waypoints correspond to a plurality of geographic coordinates associated with the geographic coordinate map, and
  wherein the plurality of geographic coordinates are formatted in a global positioning system (GPS) coordinate format, and a National Marine Electronics Association (NMEA) format; and
transmit, to a controller of the UAV, flight path data indicating the flight path,
  wherein the one or more instructions, when executed by the one or more processors to cause the device to transmit the flight path data, cause the device to:
    transmit, to the controller of the UAV, flight path data indicating a flight path in the interior of the building.

17. The non-transitory computer-readable medium of claim 16, wherein the one or more instructions, when executed by the one or more processors to cause the device to localize the UAV on the geographic coordinate map, cause the device to:
  receive, from a sensor mounted on the UAV, sensor data indicating three-dimensional geographic points; and
  compare the sensor data to the geographic coordinate map.

18. The non-transitory computer-readable medium of claim 17, wherein the sensor data is received over a low latency wireless network.

19. The non-transitory computer-readable medium of claim 16, wherein the one or more instructions, when executed by the one or more processors, further cause the device to:
  store the digital map in a network computing environment that is accessible over a low latency wireless network.

20. The non-transitory computer-readable medium of claim 19, wherein the network computing environment is a multi-access edge computing (MEC) environment.

* * * * *